United States Patent [19]

Shibayama et al.

[11] Patent Number: 5,304,580
[45] Date of Patent: Apr. 19, 1994

[54] EXPANDABLE POLYOLEFIN RESIN COMPOSITIONS

[75] Inventors: Koichi Shibayama; Masao Ogasa, both of Osaka; Toshihiro Arai, Saitama; Eiichi Takahashi, Hasuda, all of Japan

[73] Assignee: Sekisui Chemical Co., Ltd., Osaka, Japan

[21] Appl. No.: 903,585

[22] Filed: Jun. 25, 1992

[30] Foreign Application Priority Data

Jun. 27, 1991 [JP] Japan .................. 3-156807

[51] Int. Cl.$^5$ ............................................. C08F 36/00
[52] U.S. Cl. .................................. 521/150; 521/142
[58] Field of Search .......................... 521/150, 142

[56] References Cited

U.S. PATENT DOCUMENTS

| 3,852,177 | 12/1974 | Atchison et al. | 204/159.17 |
| 4,525,297 | 6/1985 | Yamane et al. | 252/511 |
| 4,766,159 | 8/1988 | Kitagawa et al. | 521/134 |

FOREIGN PATENT DOCUMENTS 58-57452 12/1983 Japan .

OTHER PUBLICATIONS

Derwent Publications, London, GB; AN 84-297694 & JP-A-59 184 629, (Sekisui) Oct. 20, 1984 (Abstract).
Derwent Publications, London, GB; AN 88-045862 & JP-A-63 003 038 (Mitsui) Jan. 8, 1988 (Abstract).

Primary Examiner—John Kight, III
Assistant Examiner—T. Mosely
Attorney, Agent, or Firm—Nikaido, Marmelstein, Murray & Oram

[57] ABSTRACT

The invention provides an expandable polyolefin resin composition comprising (a) 40 to 100 wt. % of a polypropylene resin having a melt index of 0.5 to 12, (b) 0 to 60 wt. % of a polyethylene resin having a melt index of 2 to 50 (c) 0.5 to 10 parts by weight of the di(meth)acrylate of an aliphatic dihydric alcohol having a methylene group with 2 to 18 carbon atoms between the (meth)acryloyloxy groups at both ends per 100 parts by weight of the combination of the resins (a) and (b), and (d) 1 to 50 parts by weight of a thermally decomposable blowing agent. Preferably the composition further comprises (e) 0.5 to 5 parts by weight of a monofunctional monomer. When uniformly crosslinked, the composition affords an expandable polyolefin resin composition suited to production of a crosslinked polyolefin resin foam excellent in heat resistance, toughness and moldability of formability and appearing homogeneous.

9 Claims, No Drawings

EXPANDABLE POLYOLEFIN RESIN COMPOSITIONS

BACKGROUND OF THE INVENTION

The present invention relates to expandable polyolefin resin compositions, and more particularly to expandable polyolefin resin compositions suitable for preparing crosslinked polyolefin resin foams which have high heat resistance and can be fabricated into complex shapes. The invention further relates to cross-linked polyolefin resin foams prepared from such resin compositions by crosslinking and subsequent foaming.

Polyolefin resin foams are in prevalent use as heat-insulating materials and miscellaneous goods because of their excellent flexibility and high heat resistance, and have recently found wide use as interior finishing materials for motor vehicles and like vehicles, for example, as heat-insulating materials for ceilings, doors, instrument panels, etc. Such interior finishing materials for vehicles are prepared, for example, by affixing a sheet of crosslinked polyolefin resin foam to a skin material and forming the resulting shape by vacuum forming or compression molding.

Generally, vacuum forming or compression molding is conducted at a high temperature of 120° to 200° C. For molding at such a high temperature, conventional polyethylene-base polyolefin resin foams are low in heat resistance and therefore unusable, and polypropylene-base polyolefin resin foams are used.

In producing polyolefin resin foams, resin compositions are crosslinked usually by 1) heating the resin composition with an organic peroxide incorporated therein, or 2) irradiating the resin composition with an ionizing radiation. These methods are practiced industrially. However, although effective for cross-linking polyethylene, these crosslinking methods are not suited to the above-mentioned polypropylene-base polyolefin resin because when crosslinked by either of these methods, polypropylene has its molecular chain broken at the same time to deteriorate. In view of this fact, polypropylene-base resins are crosslinked by admixing a polyfunctional monomer, such as divinylbenzene, diethylene glycol dimethacrylate or trimethylolpropane tri(meth)acrylate, with the resin and irradiating the resulting resin composition with an ionizing radiation (Examined Japanese Patent Publications SHO 46-38716 and SHO 60-11935, Unexamined Japanese Patent Publications SHO 57-212236 and SHO 61-69844, etc.). Among these publications, the publication SHO 46-38716 proposes two kinds of auxiliary crosslinking agents: a) a compound having at least two vinyl-type double bonds in the molecule, and b) the combination of an aromatic compound having one vinyl group in the molecule and an organic compound having at least two (meth)acryloyloxy groups in the molecule. The latter is favorably used chiefly for crosslinking resins with an organic peroxide.

Nevertheless, when these polyfunctional monomers are used for crosslinking resin compositions, the polyfunctional monomer, which has different compatibilities with different resin components of the composition, becomes present as localized in the resin component having the highest compatibility therewith, permitting the composition to be crosslinked unevenly when irradiated with an ionizing radiation.

Further when polyolefin resin compositions are given an increased gel fraction to obtain a viscosity required for foaming in such a state, the resin foam obtained has higher hardness and less elongation than is needed for molding. Difficulties are then encountered in molding the foam into a complex shape having a deep recess, possibly causing the rupture of the foam. If a reduced amount of polyfunctional monomer is used to improve the moldability, the composition can not be crosslinked uniformly, failing to give a foam which appears homogeneous.

In view of the foregoing problems, an object of the present invention is to provide an expandable polyolefin resin composition which can be crosslinked uniformly in its entirety to produce a crosslinked polyolefin resin foam which is excellent in heat resistance, toughness and moldability or formability and which appears homogeneous.

Another object of the invention is to provide a crosslinked polyolefin resin foam which is obtained by crosslinking and foaming the expandable polyolefin resin composition.

SUMMARY OF THE INVENTION

We have carried out intensive research and consequently found that the above objects can be fulfilled by using a mixture of polypropylene and polyethylene each having a specified melt index as resin components and further using a specified bifunctional monomer as an auxiliary crosslinking agent, in combination with a monofunctional monomer when required, whereby the present invention has been accomplished.

More specifically, the present invention provides an expandable polyolefin resin composition comprising:
(a) 40 to 100 wt. % of a polypropylene resin having a melt index of 0.5 to 12,
(b) 0 to 60 wt. % of a polyethylene resin having a melt index of 2 to 50,
(c) 0.5 to 10 parts by weight of the di(meth)acrylate of an aliphatic dihydric alcohol having a methylene group with 2 to 18 carbon atoms between the (meth)acryloyloxy groups at both ends per 100 parts by weight of the combination of the polypropylene resin (a) and the polyethylene resin (b), and
(d) 1 to 50 parts by weight of a thermally decomposable blowing agent.

Preferably, the resin composition of the present invention further contains in addition to the components (a), (b), (c) and (d)
(e) 0.5 to 5 parts by weight of a monofunctional monomer per 100 parts by weight of the combination of the polypropylene resin (a) and the polyethylene resin (b).

The present invention also provides a crosslinked polyolefin resin foam obtained by crosslinking and foaming the expandable polyolefin resin composition.

The resin composition of the present invention contains a bifunctional monomer serving as an auxiliary crosslinking agent, i.e., the di(meth)acrylate of an aliphatic dihydric alcohol having a methylene group with 2 to 18 carbon atoms between the (meth)acryloyloxy groups at both ends, preferably in combination with a monofunctional monomer serving also as an auxiliary crosslinking agent. The presence of the monomer(s) makes it possible to crosslink the resin composition uniformly and to subsequently foam the composition to obtain a crosslinked polyolefin resin foam which is outstanding in heat resistance, toughness, and moldability of formability and which appears homogeneous.

The crosslinked polyolefin resin foam thus obtained exhibits improved dimensional stability when heated and also has improved heat resistance.

DETAILED DESCRIPTION OF THE INVENTION

The polypropylene resin (a) for use in the resin composition of the present invention is 0.5 to 12, preferably 1 to 10, more preferably 1 to 5, in melt index (hereinafter referred to briefly as "MI"). If the MI of the polypropylene resin is less than 0.5, the resin foam prepared from the composition exhibits an impaired appearance when made into a sheet, whereas if the MI is in excess of 12, the foam is insufficient in heat resistance.

The polypropylene resin for use in the present resin composition may be in the form of propylene homopolymers, a propylene-base copolymer or a mixture of these polymers insofar as these polymers are in the foregoing MI range. The copolymer can be, for example, a propylene-α-olefin copolymer, containing at least 85 wt. % of polypropylene portion. Examples of useful α-olefins are ethylene, 1-hexene, 4-methyl-1-pentene, 1-octene, 1-butene and 1-pentene.

The polyethylene resin (b) for use in the resin composition of the invention is 2 to 50, preferably 3 to 30, more preferably 4 to 25, in MI. If the MI of the polyethylene is smaller than 2, the resin foam obtained from the composition exhibits a poor appearance when formed into a sheet, whereas MI values exceeding 50 give rise to a problem as to the heat resistance of the foam.

The polyethylene resin for use in the present resin composition may be in the form of ethylene homopolymer, an ethylene-base copolymer or a mixture of these polymers insofar as these polymers are in the foregoing MI range. The copolymer can be, for example, an ethylene-α-olefin copolymer containing at least 80 wt. % of polyethylene portion. Examples of useful α-olefins are propylene, 1-hexene, 4-methyl-1-pentene, 1-octene, 1-butene, 1-pentene, etc.

The proportions of polypropylene resin and polyethylene resin for use in the present composition are 40 to 100 wt. % and 0 to 60 wt. %, respectively. When the proportions are in these respective ranges, a crosslinked foam can be obtained which is excellent in properties and moldability or formability at high temperatures and which exhibits a good appearance. It is more preferable to use 45 to 85 wt. % of polypropylene resin and 15 to 55 wt. % of polyethylene resin.

The auxiliary crosslinking agents for use in the present resin composition include a bifunctional monomer, i.e. the di(meth)acrylate of an aliphatic dihydric alcohol (c) having a methylene group with 2 to 18 carbon atoms between the (meth)acryloyloxy groups at both ends.

When the methylene group between the (meth)acryloyloxy groups at both ends has more than 18 carbon atoms, the molecule contains a reduced proportion of functional groups, failing to form a specified amount of gel relative to the amount of di(meth)acrylate used. Preferably, the methylene group has 6 to 10 carbon atoms.

The bifunctional di(meth)acrylate can be represented by the general formula (III) given below.

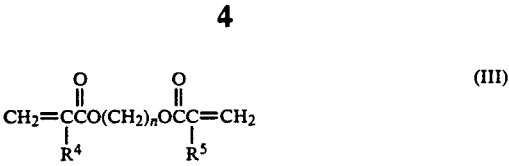

wherein $R^4$ and $R^5$ may be the same or different and are each a hydrogen atom or methyl, and n is an integer of 2 to 18.

Examples of useful bifunctional di(meth)acrylates are 1,6-hexanediol di(meth)acrylate, 1,9-nonanediol di(meth)acrylate and 1,10-decanediol di(meth)acrylate.

The bifunctional di(meth)acrylate is used in a proportion of 0.5 to 10 parts by weight per 100 parts by weight of the combination of polypropylene resin and polyethylene resin. If the proportion is less than 0.5 part by weight, the composition will not be fully cross-linked, failing to afford a homogeneous foam, whereas if it is conversely in excess of 10 parts by weight, too high a crosslinking density presents difficulty in molding the resulting foam. It is preferable to use 0.8 to 5 parts by weight of the di(meth)acrylate per 100 parts by weight of the combination of resin components.

The bifunctional di(meth)acrylates exemplified above may be used singly, or at least two of them may be used in combination. Other polyfunctional auxiliary crosslinking agents are also usable conjointly with these acrylates. When such other agents are to be used conjointly, it is desirable that the bifunctional di(meth)acrylate(s) be used in an amount of at least 30 wt. % of the total amount of auxiliary crosslinking agents, and that the total amount be within the range of 0.5 to 10 parts by weight per 100 parts by weight of the combination of resin components. Examples of such other polyfunctional auxiliary crosslinking agents are those active to ionizing radiations and including, for example divinylbenzene, trimethylolpropane tri(meth)acrylate and 2,2-bis[4-(acryloxydiethoxy)phenyl]propane.

The thermally decomposable blowing agents (d) to be used in the resin composition of the present invention is a compound which produces a gas when heated for decomposition. Examples of useful blowing agents are azodicarbonamide, benzene sulfonyl hydrazide, dinitrosopentamethylenetetramine, toluenesulfonyl hydrazide, 4,4-oxybis(benzene sulfonyl hydrazide) and the like. These agents may be used single, or at least two of them are usable in combination.

In accordance with the desired expansion ratio, the thermally decomposable blowing agent can be used in a suitable amount of 1 to 50 parts by weight per 100 parts by weight of the combination of polypropylene resin and polyethylene resin. It is desirable to use 4 to 25 parts by weight of the agent per 100 parts by weight of the combination.

According to the present invention, the monofunctional monomer (e) serving as an auxiliary cross-linking agent is further incorporated into the resin composition when so required. An example of useful monofunctional monomer is an acrylate or methacrylate represented by the following general formula (I).

wherein $R^1$ is a hydrogen atom or methyl, and $R^2$ is straight-chain, branched-chain or cyclic alkyl having 1 to 20 carbon atoms, phenyl or substituted phenyl.

More specific examples of such (meth)acrylates are methyl (meth)acrylate, n-butyl (meth)acrylate, tert-butyl (meth)acrylate, lauryl (meth)acrylate, dodecyl (meth)acrylate, cyclohexyl (meth)acrylate, phenyl (meth)acrylate and the like.

Another example of useful monofunctional monomer is styrene or a derivative thereof represented by the following general formula (II).

$$H_2C=CH-R^3 \qquad (II)$$

wherein $R^3$ is phenyl or substituted phenyl.

More specific examples of derivatives of styrene are o-, m- and p-methylstyrenes, o-, m- and p-ethylstyrenes, etc.

The monofunctional monomer is used in a proportion of 0.5 to 5 parts by weight per 100 parts by weight of the combination of polypropylene resin and polyethylene resin. When the resin composition is crosslinked with the specified proportion of the monofunctional monomer incorporated therein, the monomer acts as a plasticizer as fixed in the molecule, permitting the resulting foam to exhibit full elongation during molding even when having a high gel fraction. If the proportion is less than 0.5 part by weight, the monofunctional monomer fails to exhibit its effect sufficiently, whereas presence of more than 5 parts by weight of the monomer conversely results in too high a crosslinking density, presenting difficulty in molding the foam. It is desirable to use 0.8 to 3.5 parts by weight of the monomer per 100 parts by weight of the combination of resin components.

Antioxidants, thermal stabilizers, metal harm inhibitors, inorganic fillers, ultraviolet absorbers, petroleum resins, pigments, etc. can be incorporated into the resin composition of the invention in accordance with the contemplated use thereof. Any antioxidant is usable insofar as it is capable of preventing deterioration of polymers due to oxidation. Examples of useful antioxidants are those commercially available, such as phenolic antioxidants, phosphorus antioxidants, amine antioxidants and sulfur antioxidants. These antioxidants can be used singly or in admixture.

The expandable polyolefin resin composition of the present invention is prepared by kneading the desired components described above in a molten state at a temperature lower than the decomposition temperature of the thermally decomposable blowing agent using a single-screw extruder, twin-screw extruder, Banbury mixer, kneader-mixer, rolls or like universal kneader, and forming the mixture usually into a sheet.

A crosslinked foam can be prepared by irradiating the sheet of expandable resin composition obtained with an ionizing radiation to crosslink the resins and thereafter heating the sheet at a temperature not lower than the decomposition temperature of the blowing agent to foam the sheet. Examples of useful ionizing radiations are alpha radiation, beta radiation, gamma radiation, electron rays, etc. The dose of the radiation is usually 1 to 20 Mrad.

The crosslinked foam thus obtained has a good appearance, is excellent in heat resistance, toughness and moldability, remains free of rupture during molding at a high temperature and can be fabricated into molded bodies having a complex shape and deep recesses, for example, for use as a finishing material for vehicles.

The reason why the present resin composition achieves such results will presumably be as follows although still remaining to be fully clarified. Among the auxiliary crosslinking agents for use in the present invention, the bifunctional monomer is nearly as compatible with the polypropylene resin as with the polyethylene resin and can therefore be uniformly dispersed in the resin mixture, permitting the resin mixture to undergo uniform crosslinking. Further when the monofunctional monomer serving as an auxiliary crosslinking agent is admixed with the resin composition for crosslinking, the monofunctional monomer acts as a plasticizer even when the composition has a high gel fraction, with the result that the foam exhibits full elongated during molding. Accordingly, the foam obtained is excellent in moldability and toughness.

EXAMPLES

The present invention will be described in greater detail with reference to the following examples. However, the invention is not limited to these examples.

EXAMPLE 1

To a resin blend of 80 wt. % of polypropylene (MI: 1.5) and 20 wt. % of polyethylene (MI: 7) were added 1.6 parts by weight of 1,9-nonanediol dimethacrylate serving as an auxiliary crosslinking agent and 13 parts by weight of azodicarbonamide as a blowing agent per 100 parts by weight of the blend. Also added to the resin blend were suitable amounts of 2,6-di-tert-butyl-p-cresol and dilauryl thiopropionate as antioxidants and methylbenzotriazole as a metal harm inhibitor. The mixture obtained was melted and kneaded with 6-inch rolls at a temperature of 170° C. at a speed of 20 r.p.m. for 5 minutes and then made into a plate. The plate prepared was formed into a 1-mm-thick sheet at a temperature of 180° C. under a pressure of 100 kg/cm². The sheet of expandable resin composition thus obtained was irradiated with electron rays at a dose of 6 Mrad for crosslinking. The crosslinked sheet was thereafter foamed in an oven at a temperature of 250° C. for 5 minutes to obtain a crosslinked foam having an expansion ratio of 26 times and a thickness of 3.0 mm.

The crosslinked foam obtained was subjected to vacuum forming, and the product obtained was checked for the evaluation of appearance and vacuum formability.

Table 1 shows the particulars of the composition and the result of evaluation.

EXAMPLES 2-7 AND COMPARATIVE EXAMPLES 1-3

Crosslinked foams were obtained in the same manner as in Example 1 by preparing sheets of expandable resin compositions from specified amounts of ingredients listed in Table 1, irradiating the sheets with electron rays and foaming the resulting sheets by heating.

The crosslinked foams obtained were subjected to vacuum forming, and the products formed were checked for the evaluation of appearance and vacuum formability.

Table 1 collectively shows the particulars of the compositions and the results of evaluation.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| Polypropylene (PP) | | | | | | | | | | |
| MI | 1.5 | 1.5 | 1.5 | 3.0 | 1.0 | 1.5 | 0.5 | 1.5 | 1.5 | 1.5 |
| Tm | 145 | 145 | 145 | 152 | 141 | 145 | 148 | 145 | 145 | 145 |
| Polyethylene (PE) | | | | | | | | | | |
| MI | 7 | 7 | 7 | 7 | 7 | 7 | 7 | 7 | 7 | 7 |
| Density | 0.920 | 0.920 | 0.920 | 0.920 | 0.920 | 0.920 | 0.920 | 0.920 | 0.920 | 0.920 |
| PP/PE (wt. ratio) | 80/20 | 80/20 | 80/20 | 50/50 | 70/30 | 80/20 | 80/20 | 60/40 | 60/40 | 60/40 |
| Auxiliary cross-linking agent | | | | | | | | | | |
| Kind | ACA 1 | ACA 2 | ACA 3 | ACA 1 | ACA 1 | ACA 4 | ACA 4 | TMPT | TMPT | DVB |
| Parts by wt. | 1.6 | 0.9 | 2.5 | 1.0 | 2.0 | 2.4 | 2.4 | 3.0 | 0.5 | 3.0 |
| Amount of blowing agent (wt. parts) | 13 | 13 | 13 | 13 | 13 | 13 | 13 | 13 | 13 | 13 |
| Expansion ratio | 25 | 25 | 25 | 25 | 25 | 25 | 25 | 25 | — | 25 |
| Cell diam. (mm) of foam | 0.21 | 0.20 | 0.24 | 0.22 | 0.21 | 0.21 | 0.20 | 0.21 | — | 0.43 |
| Vacuum formability (H/D) | 1.5 | 1.6 | 1.9 | 1.8 | 1.5 | 1.5 | 1.7 | 0.6 | — | 0.7 |
| Appearance | S | S | S | S | S | S | S | S | I | S |

Notes to Table 1

1) Tm (melting point) is the endothermic maximum peak temperature determined by DSC, product of Seiko Instruments Co., Ltd., for a sample of the polymer which was heated at a rate of 5° C./min.
2) MI was determined according to ASTM D1238.
3) Azodicarbonamide was used as a blowing agent for all the compositions.
4) The formed product was observed with the unaided eye for the evaluation of appearance. "S" means that the product had a smooth surface, and "I" means that the product had surface irregularities.
5) The vacuum formability was evaluated in terms of H/D ratio which was determined by heating the foam with a far infrared heater to a surface temperature of 150° C. to 160° C., subjecting the heated foam to vacuum forming using a cylindrical female mold, measuring the depth H and the diameter D of the formed body and calculating the ratio of H to D. The greater the H/D value, the better is the formability.
6) TMPT: trimethylolpropane trimethacrylate; DVB: divinylbenzene
7) The sheet which failed to form closed cells was not foamable and therefore was not evaluated for formability.
8) ACA 1: 1,9-nonanediol dimethacrylate; ACA 2: 1,10-decanediol dimethacrylate; ACA 3: 1,6-hexanediol diacrylate; ACA 4: TMPT + 1,9-nonanediol dimethacrylate (1:1 in weight ratio).

Table 1 reveals that the crosslinked foams of Examples 1 to 7 according to the present invention are more excellent in vacuum formability at a high temperature (160° C.) than those of Comparative Examples 1 to 3 and are therefore homogeneous foams highly amenable to the forming process and having a satisfactory appearance.

EXAMPLE 8

A crosslinked foam was prepared by the same procedure as in Example 1 with the exception of using as a bifunctional monomer auxiliary crosslinking agent 2.7 parts by weight of 1,10-decanediol dimethacrylate per 100 parts by weight of the resin blend in place of 1,9-nonanediol dimethacrylate and using as a monofunctional monomer auxiliary crosslinking agent 1.2 parts by weight of lauryl methacrylate per 100 parts by weight of the resin blend.

The crosslinked foam obtained was subjected to vacuum forming, and the product formed was checked for the evaluation of appearance and vacuum formability.

Table 2 shows the particulars of the composition and the result of evaluation.

EXAMPLES 9-12 AND COMPARATIVE EXAMPLES 4-6

Crosslinked foams were obtained in the same manner as in Example 8 by preparing sheets of expandable resin compositions from specified amounts of ingredients listed in Table 2, irradiating the sheets with electron rays and foaming the resulting sheets by heating.

The crosslinked foams obtained were subjected to vacuum forming, and the products formed were checked for the evaluation of appearance and vacuum formability.

Table 2 collectively shows the particulars of the compositions and the results of evaluation.

TABLE 2

|  | Ex. 8 | Ex. 9 | Ex. 10 | Ex. 11 | Ex. 12 | Comp. Ex. 4 | Comp. Ex. 5 | Comp. Ex. 6 |
|---|---|---|---|---|---|---|---|---|
| Polypropylene (PP) | | | | | | | | |
| MI | 1.5 | 1.5 | 1.5 | 3.0 | 1.0 | 1.5 | 1.5 | 1.5 |
| Tm | 145 | 145 | 145 | 152 | 141 | 145 | 145 | 145 |
| Polyethylene (PE) | | | | | | | | |
| MI | 7 | 7 | 7 | 7 | 7 | 7 | 7 | 7 |
| Density | 0.920 | 0.920 | 0.920 | 0.920 | 0.920 | 0.920 | 0.920 | 0.920 |
| PP/PE (wt. ratio) | 80/20 | 80/20 | 80/20 | 50/50 | 70/30 | 80/20 | 80/20 | 80/20 |
| Auxiliary cross-linking agent | | | | | | | | |
| A | | | | | | | | |
| Kind | ACA 2 | ACA 2 | ACA 3 | ACA 2 | ACA 2 | TMPT | TMPT | DVB |

TABLE 2-continued

|  | Ex. 8 | Ex. 9 | Ex. 10 | Ex. 11 | Ex. 12 | Comp. Ex. 4 | Comp. Ex. 5 | Comp. Ex. 6 |
|---|---|---|---|---|---|---|---|---|
| Parts by wt. | 2.7 | 2.1 | 2.5 | 2.5 | 2.7 | 3.0 | 0.5 | 3.0 |
| B |  |  |  |  |  |  |  |  |
| Kind | ACA 5 | ACA 6 | ACA 5 | ACA 5 | ACA 5 | — | — | — |
| Parts by wt. | 1.2 | 1.0 | 1.2 | 1.2 | 1.2 | — | — | — |
| Amount of blowing agent (wt. parts) | 13 | 13 | 13 | 13 | 13 | 13 | 13 | 13 |
| Expansion ratio | 25 | 25 | 25 | 25 | 25 | 25 | — | 25 |
| Gel fraction (%) | 44 | 42 | 45 | 42 | 45 | 44 | 22 | 43 |
| Vacuum formability (H/D) | 1.7 | 1.8 | 1.9 | 1.8 | 1.5 | 0.6 | — | 0.7 |
| Appearance | S | S | S | S | S | With breaks | — | With breaks |

Notes to Table 2

9) Auxiliary crosslinking agents A and B are a bifunctional monomer and a monofunctional monomer, respectively.
10) ACA 2: 1,10-decanediol dimethacrylate; ACA 3: 1,6-hexanediol diacrylate; ACA 5: lauryl methacrylate; ACA 6: cyclohexyl methacrylate.

Table 2 reveals that the crosslinked foams of Examples 8 to 12 according to the present invention are more excellent in vacuum formability at a high temperature (160° C.) than those of Comparative Examples 4 to 6 and are therefore homogeneous foams highly amenable to the forming process and having a satisfactory appearance.

EXAMPLE 13

A crosslinked foam was prepared by the same procedure as in Example 1 with the exception of using as a bifunctional monomer auxiliary crosslinking agent 2.6 parts by weight of 1,10-decanediol dimethacrylate per 100 parts by weight of the resin blend in place of 1,9-nonanediol dimethacrylate and using as a monofunctional monomer auxiliary crosslinking agent 1.6 parts by weight of styrene per 100 parts by weight of the resin blend.

The crosslinked foam obtained was subjected to vacuum forming, and the product formed was checked for the evaluation of appearance and vacuum formability.

Table 3 shows the particulars of the composition and the result of evaluation.

EXAMPLE 14-17

Crosslinked foams were obtained in the same manner as in Example 13 by preparing sheets of expandable resin compositions from specified amounts of ingredients listed in Table 3, irradiating the sheets with electron rays and foaming the resulting sheets by heating.

Formed products were prepared from the foams and then checked for evaluation by the same procedures as in the above examples.

Table 3 collectively shows the particulars of the compositions and the results of evaluation.

TABLE 3

|  | Ex. 13 | Ex. 14 | Ex. 15 | Ex. 16 | Ex. 17 |
|---|---|---|---|---|---|
| Polypropylene (PP) |  |  |  |  |  |
| MI | 1.5 | 1.5 | 1.5 | 3.0 | 1.0 |
| Tm | 145 | 145 | 145 | 152 | 141 |
| Polyethylene (PE) |  |  |  |  |  |
| MI | 7 | 7 | 7 | 7 | 7 |
| Density | 0.920 | 0.920 | 0.920 | 0.920 | 0.920 |
| PP/PE (wt. ratio) | 80/20 | 80/20 | 80/20 | 50/50 | 70/30 |
| Auxiliary crosslinking agent |  |  |  |  |  |
| A |  |  |  |  |  |
| Kind | ACA 2 | ACA 2 | ACA 3 | ACA 2 | ACA 2 |
| Parts by wt. | 2.6 | 2.1 | 2.5 | 2.3 | 2.0 |
| B |  |  |  |  |  |
| Kind | ACA 7 | ACA 8 | ACA 7 | ACA 7 | ACA 7 |
| Parts by wt. | 1.6 | 1.6 | 1.4 | 1.0 | 2.0 |
| Amount of blowing agent (wt. parts) | 13 | 13 | 13 | 13 | 13 |
| Expansion ratio | 25 | 25 | 25 | 25 | 25 |
| Gel fraction (%) | 46 | 43 | 44 | 42 | 45 |
| Vacuum formability (H/D) | 1.8 | 1.8 | 1.9 | 1.8 | 1.5 |
| Appearance | S | S | S | S | S |

Notes to Table 3

11) Auxiliary crosslinking agents A and B are a bifunctional monomer and a monofunctional monomer, respectively.
12) ACA 2: 1,10-decanediol dimethacrylate; ACA 3: 1,6-hexanediol diacrylate; ACA 7: styrene; ACA 8: p-methylstyrene.

Table 3 reveals that the crosslinked foams of Examples 13 to 17 according to the present invention are more excellent in vacuum formability at a high temperature (160° C.) than those of Comparative Examples shown in Table 2 and are therefore homogeneous foams highly amenable to the forming process and having a satisfactory appearance.

What we claim is:

1. An expandable polyolefin resin composition comprising:
   (a) 40 to 100 wt. % of a polypropylene resin having a melt index of 0.5 to 12,
   (b) 0 to 60 wt. % of a polyethylene resin having a melt index of 2 to 50,
   (c) 0.5 to 10 parts by weight of the di(meth)acrylate of an aliphatic dihydric alcohol having a methylene group with 2 to 18 carbon atoms between the (meth)acryloyloxy groups at both ends per 100 parts by weight of the combination of the polypropylene resin (a) and the polyethylene resin (b), and
   (d) 1 to 50 parts by weight of a thermally decomposable blowing agent.

2. An expandable polyolefin resin composition as defined in claim 1 which further comprises in addition to the components (a), (b), (c) and (d)
   (e) 0.5 to 5 parts by weight of a monofunctional monomer per 100 parts by weight of the combination of the polypropylene resin (a) and the polyethylene resin (b).

3. A resin composition as defined in claim 1 or 2 wherein the di(meth)acrylate is a compound selected from the group consisting of 1,6-hexanediol di(meth)acrylate, 1,9-nonanediol di(meth)acrylate and 1,10-decanediol di(meth)acrylate.

4. A resin composition as defined in claim 2 wherein the monofunctional monomer is an acrylate or a methacrylate represented by the general formula $$H_2C=C(R^1)-C(=O)-O-R^2 \qquad (I)$$

wherein $R^1$ is a hydrogen atom or methyl, and $R^2$ is straight-chain, branched-chain or cyclic alkyl having 1 to 20 carbon atoms, phenyl or substituted phenyl.

5. A resin composition as defined in claim 4 wherein the acrylate or methacrylate is a compound selected from the group consisting of methyl (meth)acrylate, n-butyl (meth)acrylate, tert-butyl (meth)acrylate, lauryl (meth)acrylate, dodecyl (meth)acrylate, cyclohexyl (meth)acrylate and phenyl (meth)acrylate.

6. A resin composition as defined in claim 2 wherein the monofunctional monomer is a compound represented by the general formula $$H_2C=CH-R^3 \qquad (II)$$

wherein $R^3$ is phenyl or substituted phenyl.

7. A resin composition as defined in claim 6 wherein the monofunctional monomer is a compound selected from the group consisting of styrene, o-, m- and p-methylstyrenes and o-, m- and p-ethylstyrenes.

8. A crosslinked polyolefin resin foam prepared by crosslinking a resin composition as defined in any of claims 1, 2, 4, 5, 6 or 7 and subsequently foaming the crosslinked compositions.

9. A resin composition as recited in claim 1, wherein said resin composition comprises 45–85 weight percent of said polypropylene resin and 15–55 weight percent of said polyethylene resin.

* * * * *